United States Patent [19]

Rossarie et al.

[11] 4,107,269

[45] Aug. 15, 1978

[54] METHOD OF PURIFYING A HYDROGENATED GAS CONTAINING ACID GASES

[76] Inventors: Jean Rossarie, 117, rue Louis Brindeau, 76600 Le Havre; Jean Maurin, rue du Temple, 76 Montivilliers, both of France

[21] Appl. No.: 813,771

[22] Filed: Jul. 7, 1977

[30] Foreign Application Priority Data

Jul. 12, 1976 [FR] France .................. 76 21355

[51] Int. Cl.² .............................................. B01D 53/34
[52] U.S. Cl. .................................. 423/222; 423/247; 423/575
[58] Field of Search ............... 423/224, 247, 226–229, 423/415 A, 222, 648, 575

[56] References Cited

U.S. PATENT DOCUMENTS

| | | | |
|---|---|---|---|
| 2,580,068 | 12/1951 | Beekley et al. | 423/247 |
| 2,881,047 | 4/1959 | Townsend | 423/575 |
| 3,099,536 | 7/1963 | Urban et al. | 423/575 |
| 3,823,227 | 7/1964 | White | 423/648 |

*Primary Examiner*—Earl C. Thomas
*Attorney, Agent, or Firm*—Haseltine, Lake & Waters

[57] ABSTRACT

A method of purifying a hydrogenated gas containing carbon monoxide and hydrogen sulphide, for example a gaseous mixture obtained by partial oxidation of hydrocarbons, has a hydrogen sulphide elimination step which comprises a reaction between sulphur dioxide and hydrogen sulphide to form sulphur, the reaction being carried out in a solvent for sulphur dioxide and hydrogen sulphide.

12 Claims, 6 Drawing Figures

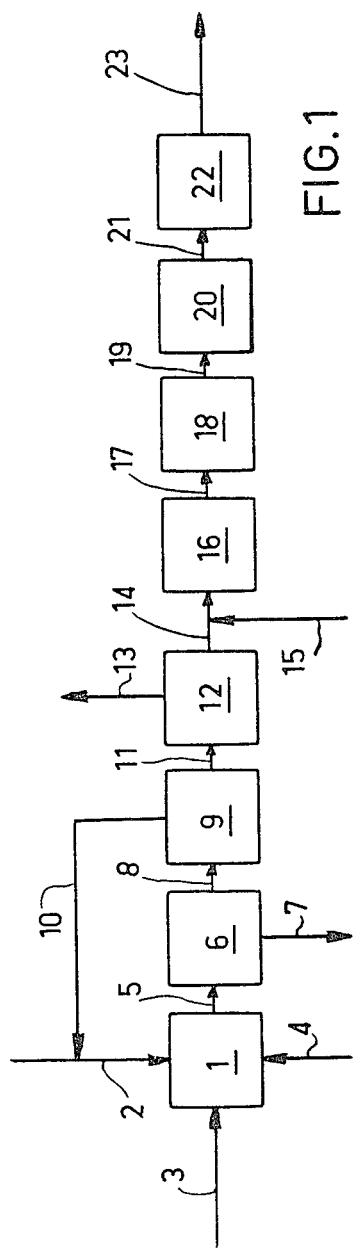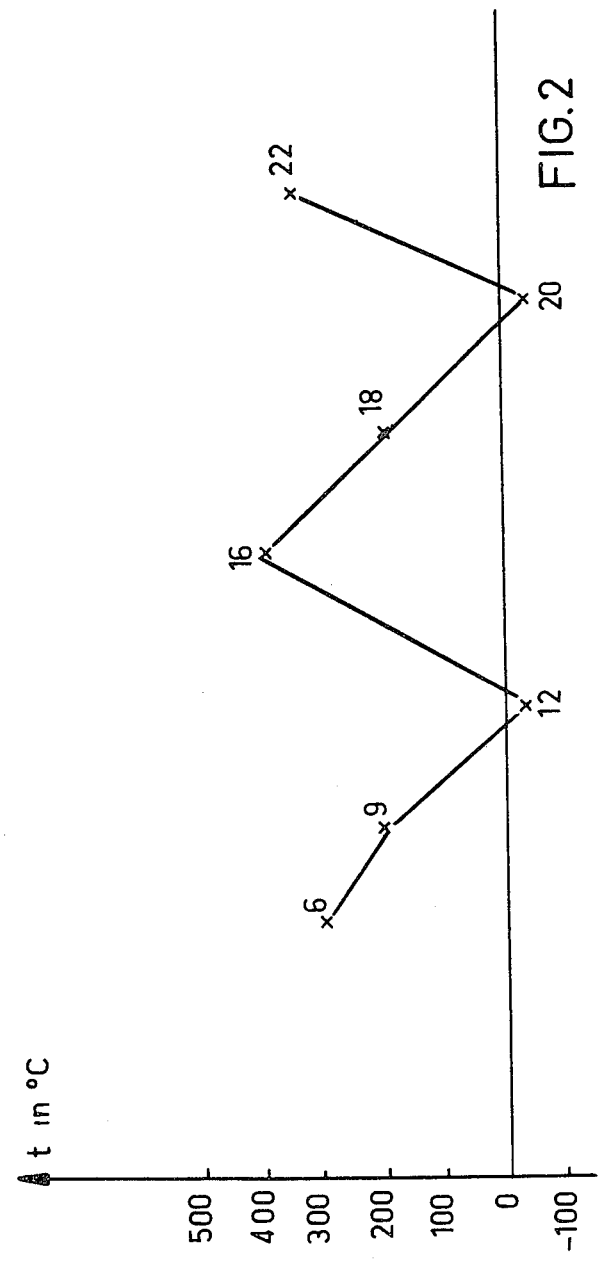

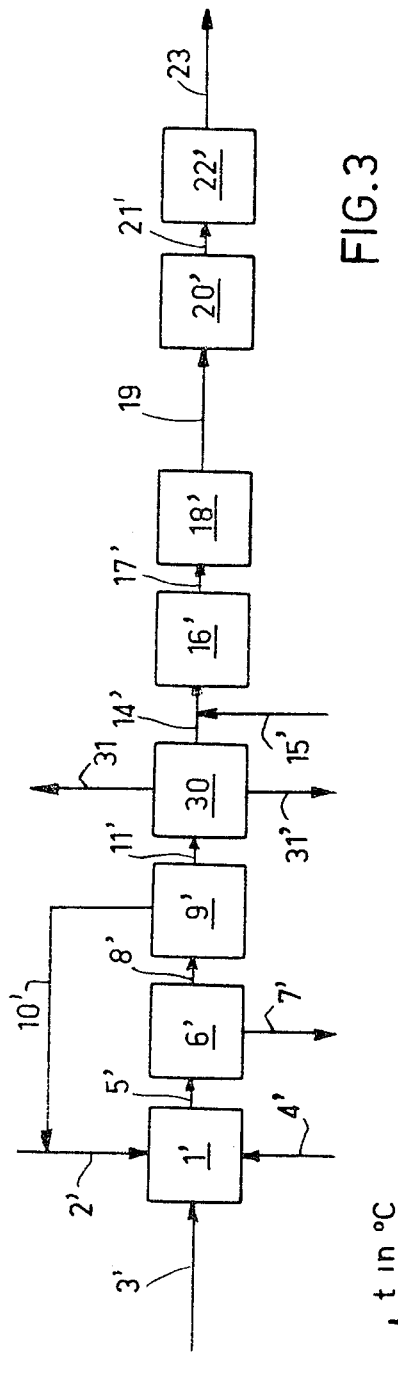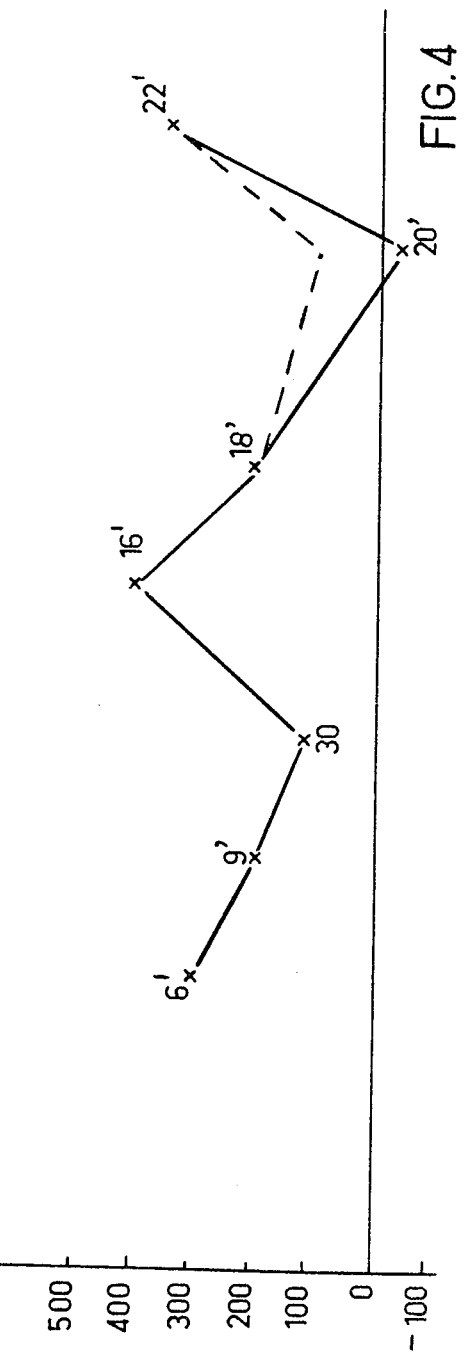

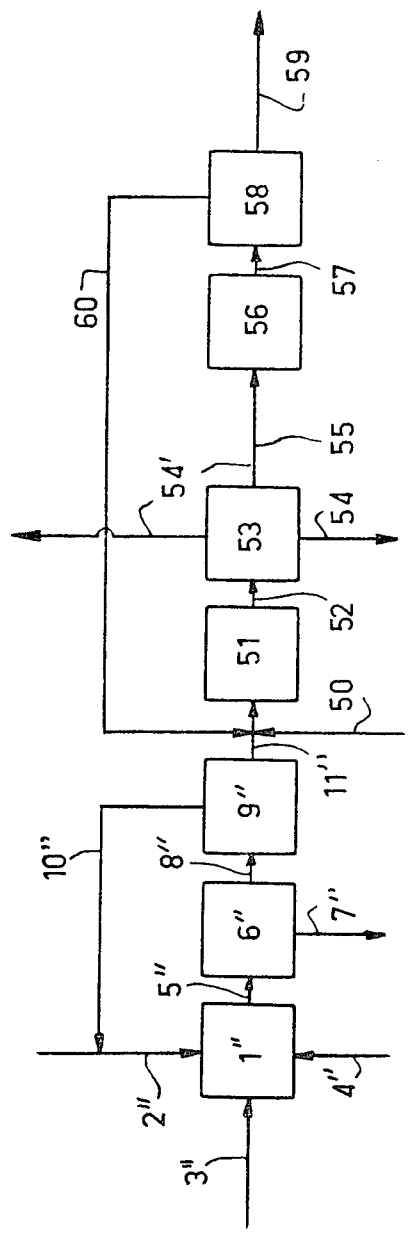
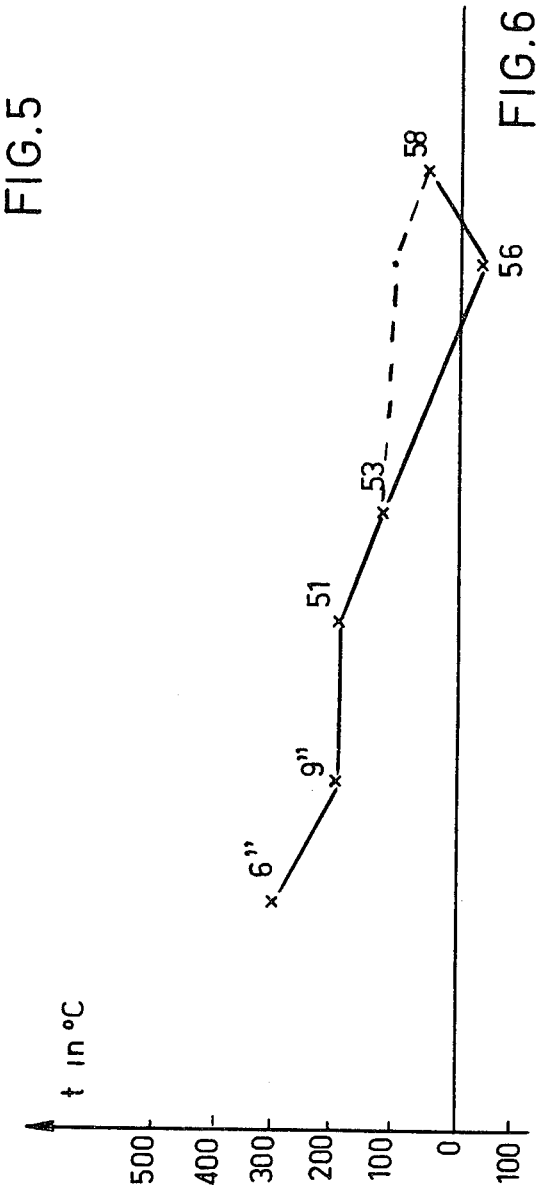

METHOD OF PURIFYING A HYDROGENATED GAS CONTAINING ACID GASES

BACKGROUND OF THE INVENTION

The invention relates to a method of purifying a hydrogenated gas containing carbon monoxide and hydrogen sulphide. It also relates to applications of the method.

Hydrogen is becoming increasingly important in the chemical, oil and petrochemical industries. It is used inter alia for synthesizing methanol, ammonia or synthetic natural gas. it is also increasingly used for refining crude oil, inter alia in hydrocracking and hydrodesulfurization processes which are being increasingly developed in order to make maximum use of the heavy fractions of crude oil.

Hydrogen can be obtained from gas mixtures coming from a wide variety of sources. It may, for example, be a by-product of catalytic reforming or steam-cracking processes. It may also be obtained by hydrocarbon decomposition processes, such as partial oxidation of feeds of substances varying from methane to very heavy hydrocarbon fractions, or steam reforming of light fractions.

The resulting gas mixtures, which contain hydrogen, may also contain hydrogen sulphide, carbon oxysulphide, carbon monoxide, carbon dioxide and light hydrocarbons such as methane. Usually one or more of these gases has to be eliminated before using the gas mixture containing hydrogen. This applies more particularly to gases such as carbon monoxide and hydrogen sulphide, which are both present in certain gas mixtures, for example those obtained by partial oxidation of hydrocarbons.

The term "hydrogenated gas" as used hereinafter denotes a gas mixture containing at least 30% by volume of hydrogen, the gas mixture also containing at least carbon monoxide and hydrogen sulphide; the term "desulphurized gas" denotes the hydrogenated gas after removal of hydrogen sulphide, and "purified gas" denotes the hydrogenated gas after removal of the carbon monoxide, hydrogen sulphide and carbon dioxide present initially in the hydrogenated gas or formed during the purification thereof, by conversion of carbon monoxide to carbon dioxide.

In order to eliminate carbon monoxide, hydrogenated gases are purified by various methods such as chemical conversion or extraction by a solvent.

Carbon monoxide can be catalytically converted to carbon dioxide by the reaction:

$$CO + H_2O \rightarrow CO_2 + H_2$$

The reaction is performed in the presence of catalysts, the nature of which varies with the operating temperature.

The "high-temperature" catalyst comprises chromium oxide and iron oxide and can be used from approximately 340° to approximately 600° C. The catalyst, which is relatively insensitive to sulphur compounds, can reduce the carbon monoxide content of the purified gas to approximately 3.5% by volume.

"Low-temperature" catalysts, comprising oxides of zinc, copper, aluminum or chromium, can be used from approximately 180° to approximately 380° C. These catalysts are very sensitive to sulphur compounds. They can reduce the carbon monoxide content of the purified gas to approximately 0.2% by volume.

The "medium-temperature" catalyst can be used at temperatures from 280° to 350° C. It is made up of cobalt and molybdenum oxides. It requires the presence of hydrogen sulphide at a concentration of 800 to 1200 ppm. This catalyst, therefore, is not poisoned by hydrogen sulphide. It can reduce the content of the hydrogenated gas to 1.5% CO.

In the remainder of this specification "high-temperature", "low-temperature" and "medium-temperature" conversion units denote carbon monoxide conversion units using "high-temperature", "low-temperature" and "medium-temperature" catalysts respectively.

Another method of converting carbon monoxide in hydrogenated gas is the "methanation" method, which comprises converting carbon monoxide to methane in accordance with the reaction:

$$CO + 3 H_2 \rightarrow CH_4 + H_2O$$

Numerous catalysts have been used in this method. The most widely used have a relatively high nickel content, namely 25 to 30% by weight. These catalysts are easily poisoned by sulphur. Methanation is performed at a temperature of from 180° to 440° C. In view of the amount of hydrogen required for methanation (3 molecules of hydrogen per molecule of carbon monoxide) the gas to be purified should preferably contain not more than 0.5% by volume of carbon monoxide.

In accordance with this specification, a "methanation" unit is a unit for working the methanation process for converting carbon monoxide to methane.

Alternatively, carbon monoxide can be eliminated from the hydrogenated gas by absorption and formation of a complex. The absorbent used can be a solution of a copper and ammonium salt. Alternatively, an aromatic copper complex can be used as described in Informations Chimie No. 132 (May 1974), page 261.

Hydrogen sulphide can be eliminated from the hydrogenated gas by absorption processes at temperatures near or below ambient temperature, using solvents such as methanol, N-methylpyrrolidone or a mixture of sulpholane and an alkanolamine.

Next, hydrogen sulphide is restored by heating the solution, then converted to sulphur in a Claus unit, where hydrogen sulphide reacts with sulphur dioxide as follows:

$$2 H_2S + SO_2 \rightarrow 3S + 2 H_2O$$

Usually Claus units comprise three steps: Sulphur dioxide is produced by oxidation of hydrogen sulphide in a thermal step at a high temperature, of the order of 1400° C; the Claus reaction occurs in the vapour phase in two catalytic steps in which the temperature is of the order of 200° to 250° C.

The gas collected at the outlet of the Claus unit still contains a low proportion of hydrogen sulphide and sulphur dioxide, which has to be eliminated to avoid atmospheric pollution when the gas is discharged to the atmosphere. Consequently, methods using a Claus unit have the disadvantage of requiring a "tail gas treatment" unit. More particularly, in addition to the last-mentioned disadvantage, considerable heat is consumed in the step for restoring hydrogen sulphide before the Claus unit.

Examples of the combined method of eliminating carbon monoxide and hydrogen sulphide from a hydrogenated gas are given in the paper presented by M. J. Milner and D. M. Jones at the 8th World Petroleum Congress (Moscow, 13-19 June 1971). This paper describes the treatment of hydrogenated gases obtained by partial oxidation of hydrocarbons; the hydrogenated gases are cooled, either by quenching or in a boiler, before elimination of carbon monoxide and hydrogen sulphide. Carbon monoxide is eliminated by catalytic conversion; hydrogen sulphide is eliminated by selective absorption followed by a Claus unit, and carbon dioxide is eliminated by selective absorption.

SUMMARY OF THE INVENTION

According to the present invention there is provided a method of purifying a hydrogenated gas containing carbon monoxide and hydrogen sulphide, which method comprises a hydrogen sulphide elimination step and at least one carbon monoxide elimination step, the hydrogen sulphide elimination step comprising a reaction between sulphur dioxide and hydrogen sulphide to form sulphur, said reaction being performed in a solvent for sulphur dioxide and hydrogen sulphide. Preferably the reaction is carried out at a temperature below that used in conventional Claus units, such as those described previously. In the remainder of this specification the hydrogen sulphide elimination step will be denoted by the term "liquid Claus". The "liquid Claus" has the advantage of not requiring the energy needed for desorption of hydrogen sulphide in a process of absorption by a solvent.

In addition, when the hydrogenated gas is at a relatively high temperature, for example, the hydrogenated gas obtained by partial oxidation of hydrocarbons, the insertion of a "liquid Claus" in a method of purifying a hydrogenated gas eliminates the need to cool the gas in order to absorb hydrogen sulphide in a solvent, followed by reheating for converting the carbon monoxide. Clearly this second saving of energy is obtained only when carbon monoxide is eliminated by catalytic conversion, after elimination of hydrogen sulphide.

Accordingly, the object of the invention is to purify hydrogenated gases containing hydrogen sulphide and carbon monoxide.

The invention relates firstly to a method of purifying a hydrogenated gas containing carbon monoxide and hydrogen sulphide, the method comprising a hydrogen sulphide elimination step and at least one carbon monoxide elimination step, wherein the hydrogen sulphide elimination step is a "liquid Claus".

The invention relates secondly to the application of the method according to the invention to the treatment of hydrogenated gases obtained by partial oxidation of hydrocarbons. As previously indicated, sulphur dioxide is reacted with hydrogen sulphide in a solvent for hydrogen sulphide and sulphur dioxide. A wide range of solvents can be used in the "liquid Claus", for example the solvents mentioned in French Pat. No. 2,230,395, such as N-methylpyrrolidone, tetramethylene sulphone, heavy alcohols or glycol-type solvents such as alkylene glycols, polyalkylene glycols or esters or ethers thereof such as diethylene glycol monomethyl or monoethyl ether.

Alternatively, use may be made of the neutral esters of phosphoric acid described in French Pat. No. 1,492,013, the esters described in U.S. Pat. No. 3,050,070, the hydrocarbon solvents described in U.S. Pat. No. 2,998,304 or the amides described in U.S. Pat. No. 3,023,088. In general, use may be made of all solvents which are inert at the reaction temperature towards hydrogen sulphide, sulphur dioxide and carbon monoxide. It is also possible to use a solvent which dissolves sulphur at the reaction temperature, for example phenols, more particularly meta-cresol, as described in French Pat. No. 7,539,319 of the present applicants, or alcohols having an aromatic ring such as benzyl alcohol, as described in the application for the first Certificate of Addition to French Pat. No. 7,539,319 filed on the same day as French Pat. No. 7,621,355.

The sulphur dioxide for the reaction can be produced by burning the sulphur formed during the reaction between hydrogen sulphide and sulphur dioxide. Combustion can be brought about in a sulphur furnace in air or in air enriched with oxygen, in which case the resulting sulphur dioxide contains nitrogen.

Sulphur dioxide may also be obtained by burning hydrogen sulphide obtained from the solution formed during extraction of hydrogen sulphide from a gas to be purified by a solvent, the solution being subsequently heated to restore the hydrogen sulphide.

There are various methods of working the "liquid Claus".

In a first embodiment, the hydrogenated gas, sulphur dioxide and the solvent are separately introduced into the same vessel. The following are collected at the vessel outlet: the solvent, sulphur, and the desulphurized gas, diluted eventually with nitrogen and containing some of the water produced in the reaction. The sulphur is separated from the solvent, e.g. by settling or filtration, after which the solvent is recycled.

The temperature and pressure of the reaction medium depend on the solvent and are chosen so that the reaction medium is liquid.

Consequently, the lower limit is fixed by the solidification point of the solvent, and the upper limit is fixed by its boiling point. The temperature can for example be from 0° to 200° C.

In this first embodiment the pressure inside the vessel can be relatively low. However, to improve contact between the reacting components it is preferable to maintain a pressure which can be from 1 to 150 atmospheres, preferably from 5 to 80 atmospheres.

Catalysts dissolved in the solvent can be used to facilitate the reaction between sulphur dioxide and hydrogen sulphide. The catalyst can for example be selected from salts of weak acids such as sodium benzoate, or nitrogen compounds such as amines.

In a second and third embodiment, the "liquid Claus" can comprise two steps.

In a second embodiment of the "liquid Claus", sulphur dioxide is first absorbed by the solvent in a first vessel. Next, the thus-obtained sulphur dioxide solution is introduced into a second vessel, where it is contacted with the hydrogenated gas. The following substances leave the second vessel: the solvent, sulphur, and the desulphurized gas containing some of the water formed during the reaction.

The sulphur is separated from the solvent, which is recycled into the first vessel.

The temperature in the first vessel must be higher than the melting point of the solvent used and below a temperature such that sulphur dioxide is sufficiently soluble. The upper temperature limit depends on the pressure inside the first vessel, since sulphur dioxide must be prevented from condensing.

Preferably, the temperature in the first vessel is from 80° C to the melting point of the solvent.

The pressure inside the first vessel, which is preferably the same as inside the second vessel, depends on the required flow rate of solvent, and consequently on the content of hydrogen sulphide in the gas to be purified.

The pressure in the first vessel can be from 1 to 150 atmospheres, preferably from 5 to 80 atmospheres.

The temperature in the second vessel is subjected to the same limitations as in the first embodiment of the "liquid Claus".

In a third embodiment of the "liquid Claus", the hydrogen sulphide in the hydrogenated gas is absorbed by the solvent in a first vessel. The substances which leave the first vessel are (a) the purified gas and (b) a solution of hydrogen sulphide in the solvent, which is contacted with sulphur dioxide in a second vessel. The solvent and sulphur are obtained from the second vessel. The sulphur is separated from the solvent, which is subsequently recycled to the first vessel.

In the third embodiment of the "liquid Claus", the temperature in the first vessel must be higher than the melting point of the solvent but lower than a temperature at which hydrogen sulphide is sufficiently soluble.

The temperature in the first vessel is preferably from 80° C to the melting point of the solvent.

The pressure in the first vessel, which is preferably the same as in the second vessel, is dependent on the required flow rate of solvent, that is, on the hydrogen sulphide content of the gas to be purified.

The pressure in the first vessel can be from 1 to 150 atmospheres, preferably from 10 to 60 atmospheres.

The temperature in the second vessel is subject to the same limitations as in the first embodiment of the method.

In the method according to the invention, the carbon monoxide elimination step can be performed by the previously-described known methods for eliminating carbon monoxide. However, it is preferable to use units for converting carbon monoxide with steam, since such units also produce hydrogen. Usually, the unit or units are disposed after the "liquid Claus" but it is preferable to dispose them in front of the "liquid Claus" when the carbon monoxide elimination stage comprises a method of catalytic conversion using a "medium-temperature" catalyst, which is not poisoned by hydrogen sulphide and requires a small quantity of hydrogen sulphide.

After the carbon monoxide has been converted to carbon dioxide, the latter substance has to be eliminated. This can be done by any known method, e.g. absorption in a solvent such as N-methyl-pyrrolidone, methanol, polyethylene glycol dimethyl ether, a mixture of sulpholane and diisopropylamine, propylene carbonate, tributyl phosphate or potassium carbonate in aqueous solution. These absorption processes are brought about at a temperature of from −50° to +150° C.

The method according to the invention can be applied to the treatment of hydrogenated gases containing hydrogen sulphide and carbon monoxide. More particularly, the method can be applied to hydrogenated gases obtained by partial oxidation of hydrocarbons.

BRIEF DESCRIPTION OF THE DRAWINGS

By way of non-limitative illustration, six figures of drawings are presented. In the drawings:

FIG. 1, which does not relate to the method of the invention, is a simplified diagram of a known method of processing a hydrogenated gas obtained by partial oxidation of hydrocarbons, as described in the aforementioned paper by Milner and Jones.

FIG. 3 is a simplified diagram of a method according to the invention for processing a hydrogenated gas obtained by partial oxidation of hydrocarbons, the process comprising a hydrogen sulphide elimination step in a "liquid Claus" unit and a carbon monoxide conversion step in a "high-temperature" conversion unit, followed by a "low-temperature" conversion unit.

FIG. 5 is a simplified diagram of a method according to the invention for processing a hydrogenated gas obtained by partial oxidation of hydrocarbons, the process comprising a carbon monoxide conversion step in a "medium-temperature" conversion unit and a hydrogen sulphide elimination step in a "liquid Claus" unit.

In FIGS. 1, 3 and 5, the units for partially oxidizing hydrocarbons have been shown, in order more clearly to indicate the energy saved by the method according to the invention using a "liquid Claus".

The energy savings are shown in FIGS. 2, 4 and 6, which are graphs of the operating temperatures of the various units shown in FIGS. 1, 3 and 5.

DESCRIPTION OF THE PREFERRED EMBODIMENTS

With reference to FIG. 1, a feed of hydrocarbons is introduced into a partial oxidation unit 1 through a line 2, steam is introduced through a line 3 and oxygen through a line 4.

The unit operates at a temperature of from 1200° to 1500° C and at a pressure of from 30 to 100 atmospheres. The resulting hydrogenated gas, which may inter alia contain hydrogen plus carbon monoxide, carbon dioxide, methane, hydrogen sulphide, carbon oxysulphide and soot, is conveyed through a line 5 into a heat recovery unit 6 or "heat recovery boiler". Unit 6 produces steam which escapes through line 7. The hydrogenated gas, cooled to approximately 300° C, is introduced through line 8 into a soot elimination unit 9. The soot is recycled to the hydrocarbon feed through line 10.

Next, the hydrogenated gas is introduced through line 11 into a hydrogen sulphide extraction unit 12. The extraction unit uses a solvent comprising methanol at a temperature of −38° C. The extracted sulphur-containing gases are absorbed in methanol by heating and are conveyed through line 13 to a conventional Claus unit (not shown). Note that the restoration of sulphur-containing gases by the solvent involves energy consumption. Steam is added through line 15 to the desulphurized gas leaving unit 12 via line 14, and the mixture is introduced into a "high-temperature" conversion unit 16. Unit 16 operates at a temperature near 400° C. The desulphurized gas, which still contains 3.5% by volume of carbon monoxide is conveyed through line 17 to a "low-temperature" conversion unit 18 operating at a temperature near 200° C. The gas leaving unit 18 is conveyed through line 19 to a carbon dioxide extraction unit 20 in order to eliminate the carbon dioxide initially present in the hydrogenated gas and/or formed during the conversion of carbon monoxide. Unit 20 uses methanol as a solvent and operates at a temperature near −38° C. The gas, which has been purified of carbon dioxide but still contains a low proportion of carbon monoxide, is introduced through line 21 to a "methanation" unit 22 operating at a temperature of approximately 350° C, where carbon monoxide is converted to methane. The purified gas is collected through line 23.

With reference to FIG. 3, only that part of the drawing which is different from FIG. 1 will be described. Units identical with those in FIG. 1 and lines conveying the same gaseous mixtures as before will be denoted by the same numbers plus a prime.

The hydrogenated gas leaving unit 9' via line 11' is conveyed to a "liquid Claus" unit 30. The reactor in unit 30 operates at a temperature in the range from 0° to 200° C, i.e. at a temperature much higher than the temperature ($-38°$ C) of unit 12 in FIG. 1. The temperature of unit 30 shown in FIG. 4 is slightly above 100° C. Hydrogen sulphide is eliminated in unit 30. At the outlet of unit 30, sulphur is connected through line 31, water through line 31', and a gas still containing carbon monoxide through line 14'. The rest of the drawing is identical with FIG. 1 and will therefore not be described.

With reference to FIG. 5, only the part of the drawing which is different from FIGS. 1 and 3 will be described. Units identical with those in FIGS. 1 and 3 and lines conveying the same gaseous mixtures will be denoted by the same numbers plus two primes.

Hydrogenated gas leaving unit 9" through line 11" is conveyed into a "medium-temperature" conversion unit 51. After entering unit 51, the hydrogenated gas is mixed with steam coming through line 50. Unit 51 operates at a temperature near 300° C. The hydrogenated gas leaving unit 51 contains not more than approximately 1.5% by volume of carbon monoxide. It is conveyed through line 52 to a "liquid Claus" unit 53. Unit 53 operates at a temperature in the range from 0° to 200° C, that is, much above the temperature ($-38°$ C) of unit 12 in FIG. 1. The temperature of unit 53, shown in FIG. 6, is slightly above 100° C. Hydrogen sulphide is eliminated in unit 53. At the outlet of unit 53, sulphur is collected through line 54, water through line 54' and desulphurized gas through line 55. The gas leaving unit 53 is conveyed through line 55 to a carbon dioxide extraction unit 56 in order to eliminate the carbon dioxide initially present in the hydrogenated gas and/or formed during the conversion of carbon monoxide. Unit 56 uses methanol as the solvent and operates at a temperature near $-38°$ C.

The gas, which has been freed from carbon dioxide but still contains a low proportion of carbon monoxide, is conveyed through line 57 to a carbon monoxide extraction unit 58 using an aromatic copper complex and operating at approximately 20° to 50° C. The purified gas is discharged through line 59 whereas the carbon monoxide is recycled through lines 60 and 11" to the "medium-temperature" conversion unit 51.

Note that in FIG. 5, the heat recovery boiler can be replaced by a water quenching unit as described in the previously mentioned paper by Milner and Jones, in which case water need not be introduced through line 50.

FIGS. 2, 4 and 6 have been placed below FIGS. 1, 3 and 5. The temperature scale is given along the ordinate; the part of the graph below a given unit corresponds to the temperature of the unit. The temperatures are those indicated in the description of FIGS. 2, 4 and 6.

The advantage of using a "liquid Claus", as shown in FIGS. 3 and 5, can be clearly seen by comparing FIGS. 2, 4 and 6. The temperature curve is much more regular in FIGS. 4 and 6, particularly in FIG. 6, compared with FIG. 2, which clearly shows the energy saved by the method according to the invention.

As previously mentioned, units 20' and 56 (FIGS. 3 and 5) for extracting carbon dioxide with methanol, operating at a temperature of $-38°$ C, can be replaced by units using other solvents such as N-methylprroli-done, polyethylene glycol ethers or potassium carbonate in aqueous solution, which operate at higher temperatures, thus further improving the temperature curve. The improved curve is shown by a broken line in FIGS. 4 and 6, in the case of a unit operating at approximately 100° C, for example in the case of potassium carbonate.

The efficiency of the reaction between sulphur dioxide and hydrogen sulphide in a solvent is illustrated in the following examples, which are in no way limitative.

EXAMPLE 1

This example relates to the reaction between sulphur dioxide and hydrogen sulphide in a sulphur solvent.

A column having a cross-section of 7 cm$^2$ and 45 cm high, containing metal packing, was filled with a sulphur solvent. The temperature in the column was kept at 130° C and the pressure was kept at 1 atmosphere absolute.

Sulphur dioxide and a mixture of nitrogen and hydrogen sulphide (77.8% by volume of nitrogen and 22.2% by volume of $H_2S$) were introduced at the bottom of the column. The flow rate of the $N_2 + H_2S$ mixture was 360 cm$^3$/min, and the flow rate of $SO_2$ was 40 cm$^3$/min.

The molar ratio of $H_2S$ to $SO_2$ was 2.

The gas leaving the top of the column was analyzed by gas chromatography.

After 2 hours the experiment was stopped and the sulphur in the column was weighed.

Thus, these two methods were used, in the case of various solvents, to measure the $H_2S$ conversion rates, which are shown in the following Table:

TABLE

| Solvent | % $H_2S$ Conversion rate |
|---|---|
| Metacresol | 40 |
| Benzyl alcohol | 70 |
| Phenylethyl alcohol | 50 |
| Anisic alcohol | 40 |
| Phenoxyethanol | 46 |

This table shows the good hydrogen conversion rates obtained by a "liquid Claus" in a sulphur solvent and proves that such a unit can be inserted in a hydrogen purification circuit without the temperature curve from one end of the circuit to the other being hilly, as in the case of conventional circuits, since the reaction temperature in the present example is 130° C.

EXAMPLE 2

This example relates to the reaction between sulphur dioxide and hydrogen sulphide in a solvent comprising diethylene glycol monomethyl ether or monoethyl ether.

The gas to be purified and the solvent containing dissolved sulphur dioxide were introduced at the bottom of a reactor containing a packing and 5 cm in diameter. The gas and the solvent flowed together towards the top of the reactor. The purified gas and the solvent were collected separately at the top of the reactor. The sulphur produced during the reaction between sulphur dioxide and hydrogen sulphide was collected at the bottom of the reactor.

The solvent, which thus consisted of diethylene glycol monomethyl ether or monoethyl ether, contained 2% by weight of water and 0.5% by weight of potassium benzoate.

The gas to be purified contained the following percentage volumes:

65.1% hydrogen
30.8% carbon dioxide
3.4% carbon monoxide
0.7% hydrogen sulphide.

In the reactor, the pressure was 55 atmospheres and the temperature was 115° C.

The flow rate of the gas to be purified was 730 normal liters per hour, whereas the flow rate of solvent containing sulphur dioxide was 0.2 liter/hour.

The flow rate of sulphur dioxide introduced with the solvent, and the height of the reactor, were chosen in relation to the desired concentration of sulphur in the purified gas.

Thus, at a sulphur dioxide flow rate of 2.47 normal liters per hour, when the packed reactor is 2 meters high, the concentration of hydrogen sulphide in the purified gas is approximately 100 ppm by volume, corresponding to a 99% yield. The sulphur dioxide concentration is less than 1 ppm by volume.

When the flow rate of sulphur dioxide is 2.497 normal liters per hour and the height of the packed reactor is 3m, the concentration of hydrogen sulphide in the purified gas is approximately 10 ppm by volume, corresponding to a 99.9% yield. The concentration of sulphur dioxide is less than 1 ppm by volume.

This Example, therefore, shows the good hydrogen sulphide conversion rates obtained with a "liquid Claus" in diethylene glycol ethers, and proves that a "liquid Claus" can be inserted in a hydrogenated gas purification circuit so as to improve the temperature curve, since the reaction temperature in this Example is 115° C.

We claim:

1. A method of purifying a hydrogenated gas containing carbon monoxide and hydrogen sulphide, the method comprising a hydrogen sulphide elimination step and at least one carbon monoxide elimination step, wherein the improvement comprises catalytic conversion of carbon monoxide at a temperature of from 280° C. to 350° C. followed by a hydrogen sulphide elimination step which comprises a reaction between sulphur dioxide and hydrogen sulphide to form sulphur, said reaction being performed in a solvent for sulphur dioxide and hydrogen sulphide at a temperature of from 0° to 200° C and at a pressure of from 1 to 150 atmospheres.

2. A method as claimed in claim 1 wherein the solvent used for the said reaction is a solvent for sulphur.

3. A method as claimed in claim 2 wherein the solvent for sulphur comprises at least one compound selected from the group consisting of phenols and alcohols having an aromatic ring.

4. A method as claimed in claim 3 wherein the solvent for sulphur comprises at least one compound selected from the group consisting of metacresol, benzyl alcohol, 2-phenoxy ethanol, anisic alcohol and phenylethyl alcohol.

5. A method as claimed in claim 1 wherein the solvent used in the said reaction is selected from the group consisting of monomethyl- and monoethylethers of diethylene glycol.

6. A method as claimed in claim 1 wherein said hydrogenated gas is a gaseous mixture obtained by partial oxidation of hydrocarbons.

7. A method of purifying a hydrogenated gas containing carbon monoxide and hydrogen sulphide, the method comprising a hydrogen sulphide elimination step and at least one carbon monoxide elimination step, wherein the improvement comprises a hydrogen sulphide elimination step which comprises a reaction between sulphur dioxide and hydrogen sulphide to form sulphur, said reaction being performed in a solvent for sulphur dioxide and hydrogen sulphide at a temperature of from 0 to 200° C. and at a pressure of from 1 to 150 atmospheres, followed by catalytic conversion of carbon monoxide at a temperature of from 340° C to 600° C and thereafter by a second catalytic conversion at a temperature of from 180° C to 380° C.

8. A method as claimed in claim 7 wherein the solvent used for the said reaction is a solvent for sulphur.

9. A method as claimed in claim 8 wherein the solvent for sulphur comprises at least one compound selected from the group consisting of phenols and alcohols having an aromatic ring.

10. A method as claimed in claim 9 wherein the solvent for sulphur comprises at least one compound selected from the group consisting of metacresol, benzyl alcohol, 2-phenoxy ethanol, anisic alcohol and phenylethyl alcohol.

11. A method as claimed in claim 7 wherein the solvent used in the said reaction is selected from the group consisting of monomethyl- and monethylethers of diethylene glycol.

12. A method as claimed in claim 7 wherein said hydrogenated gas is a gaseous mixture obtained by partial oxidation of hydrocarbons.

* * * * *